(12) United States Patent
Inoue

(10) Patent No.: US 7,298,250 B2
(45) Date of Patent: Nov. 20, 2007

(54) SEATBELT REMINDER SYSTEM

(75) Inventor: Takashi Inoue, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 502 days.

(21) Appl. No.: 10/926,988

(22) Filed: Aug. 27, 2004

(65) Prior Publication Data

US 2005/0046561 A1    Mar. 3, 2005

(30) Foreign Application Priority Data

Aug. 29, 2003    (JP) .............................. 2003-307450

(51) Int. Cl.
*B60Q 1/00* (2006.01)

(52) U.S. Cl. .................. 340/457.1; 340/457; 297/468; 297/463.2

(58) Field of Classification Search ............. 340/457.1
See application file for complete search history.

(56) References Cited

U.S. PATENT DOCUMENTS

| | | | | |
|---|---|---|---|---|
| 3,748,639 A | * | 7/1973 | Dobedoe et al. ......... | 340/457.1 |
| 5,483,221 A | * | 1/1996 | Mutter et al. ............ | 340/457.1 |
| 6,166,631 A | * | 12/2000 | Kennedy et al. ......... | 340/457.3 |
| 6,215,395 B1 | * | 4/2001 | Slaughter et al. ........ | 340/457.1 |
| 6,278,358 B1 | | 8/2001 | Spoto et al. | |
| 6,362,734 B1 | * | 3/2002 | McQuade et al. ....... | 340/457.1 |
| 6,501,374 B1 | * | 12/2002 | King et al. ............. | 340/457.1 |
| 6,977,582 B2 | * | 12/2005 | Ota et al. ............... | 340/457.1 |
| 7,161,477 B2 | * | 1/2007 | Ohtomo et al. .......... | 340/457.1 |

FOREIGN PATENT DOCUMENTS

DE    101 54 005 A1    8/2002

* cited by examiner

*Primary Examiner*—Benjamin C. Lee
*Assistant Examiner*—Eric M. Blount
(74) *Attorney, Agent, or Firm*—Birch, Stewart, Kolasch & Birch, LLP

(57) ABSTRACT

A seatbelt reminder system includes a first reminder unit (S301) which gives a first reminder when a first condition having an unfastened state of a seatbelt as at least a fulfilling condition is satisfied, a second reminder unit (S306) which gives a second reminder when a second condition having the unfastened state of the seatbelt as at least a fulfilling condition is satisfied, and a reminder-start delay unit (S305) which delays start of the second reminder when the second reminder by the second reminder element is started.

14 Claims, 4 Drawing Sheets

SEATBELT REMINDER SYSTEM

CROSS-REFERENCE TO A RELATED APPLICATION

This application claims the priority of Japanese Patent Application No. 2003-307450, which is incorporated herein by reference.

BACKGROUND OF THE INVENTION

1. Field of the Invention

The present invention relates to a seatbelt reminder system, and, more particularly, to a seatbelt reminder system which optimizes the start of giving a warning.

2. Description of the Related Art

In general, seatbelts in a vehicle are capable of fastening the bodies of crew members to their seats. Accordingly, a seatbelt reminder system is used to avoid the unfastened state of each seatbelt as much as possible.

The system employs different reminder schemes, such as a visual warning to visually notify the unfastened state of the seatbelt to a crew member by means of, for example, lighting of an indicator, and an acoustic warning to give acoustic notification to the crew member by giving a buzzer sound.

With regard to visual warning, for example, the seatbelt reminder system has various reminder schemes, such as giving a reminder by lighting an indicator until a seatbelt is fastened, and giving a first reminder by lighting an indicator for about 60 seconds and giving a second reminder by repeating flickering, achieved by light-ON for several seconds and light-OFF for several seconds, several times following the first reminder. There has been proposed a technique of allowing the system to clearly define the first reminder and the second reminder and give the defined reminders (U.S. Pat. No. 6,278,358).

The system gives the first reminder when the ignition key is switched ON from the OFF state, and gives the second reminder when a seatbelt is in an unfastened state even after the first reminder has been given.

To urge a crew member to fasten a seatbelt, the prior art technique clearly defines the first reminder to urge prompt fastening of a seatbelt and the second reminder to further urge the prompt fastening. In the case where the start condition for the second reminder is satisfied when the first reminder is finished, however, the second reminder is executed following the first reminder. That is, the first reminder and the second reminder are given consecutively, making it hard for a crew member to recognize the second reminder, so that fastening of the seatbelt cannot be urged properly.

In the system that uses visual warning and acoustic warning in parallel, particularly, when the condition for the second reminder is satisfied while the indicator is lit for about 60 seconds for visual warning with a seatbelt unfastened, buzzing as acoustic warning starts while the second reminder takes place with the indicator kept lit for visual warning. In some case, therefore, this makes a crew member notice the initiation of only the acoustic warning and makes it hard for the crew member to understand the meaning of this reminder. Even if the first reminder and the second reminder are clearly defined, therefore, there still remains an issue of how to make a crew member notice the reminders.

SUMMARY OF THE INVENTION

Accordingly, it is an object of the present invention to provide a seatbelt reminder system which is provided with definition of detailed processes at the time of starting reminder patterns to thereby promptly urge the crew member to fasten a seatbelt.

To achieve the object, according to the present invention, there is provided a seatbelt reminder system which warns a crew member when the crew member has not fastened a seatbelt and comprises a seat-belt fastening detecting element which detects a fastened state of the seatbelt; a first reminder element which gives a first reminder when a first condition having an unfastened state of the seatbelt, detected by the seat-belt fastening detecting element, as at least a fulfilling condition is satisfied; a second reminder element which gives a second reminder when a second condition having the unfastened state of the seatbelt, detected by the seat-belt fastening detecting element, as at least a fulfilling condition is satisfied; and a reminder-start delay element which delays start of the second reminder when the second reminder by the second reminder element is started.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described below referring to the accompanying drawings.

Figure 1:
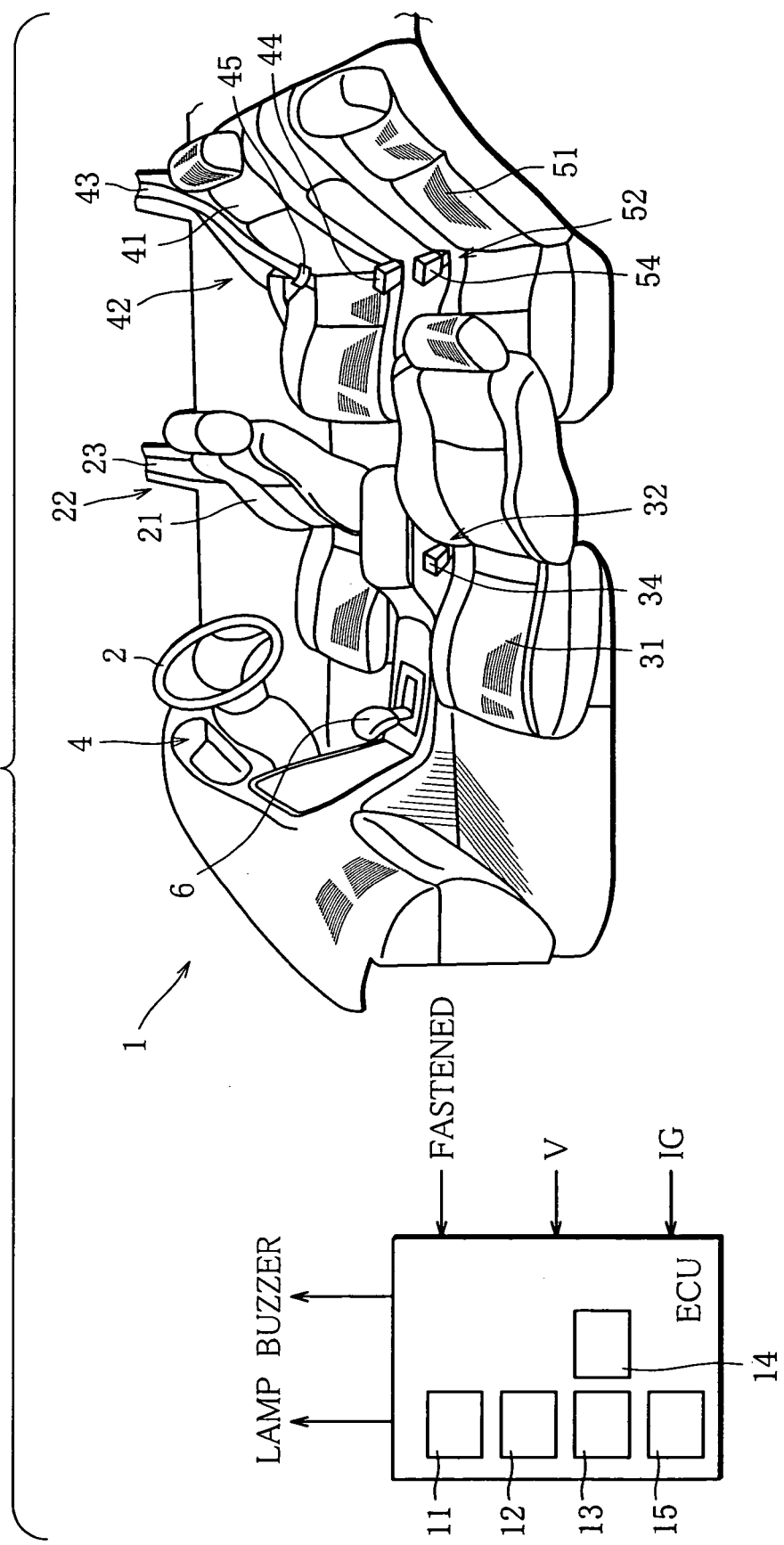
FIG. 1 is a diagram showing the internal structure of a vehicle to which a seatbelt reminder system according to one embodiment of the present invention is adapted.

FIG. 1 illustrates the internal structure of a vehicle 1 to which a seatbelt reminder system according to the present invention is adapted.

The vehicle 1 is a four-seater vehicle. The vehicle 1 has four occupants' seats, that is, a driver's seat 21, a front passenger seat 31, a right rear passenger seat 41, and a left rear passenger seat 51. A steering wheel 2, a display panel 4 and an unillustrated ignition switch (IG1) are provided at the proper positions in front of the driver seat 21. The steering wheel 2 manipulates the driving direction of the vehicle 1. The display panel 4 displays various statuses of the vehicle 1. The ON/OFF action of the IG1 changes between the engine active state and the engine inactive state. A shift lever 6 is provided at the proper position between the driver seat 21 and the navigator seat 31 to change the shift position.

The driver seat 21, the front passenger seat 31, and the right and left rear passenger seats 41 and 51 are provided with seatbelts 22, 32, 42 and 52, respectively. When fastened, the seatbelts hold the bodies of occupants in their respective seats.

The seatbelts 22, 32, 42 and 52 used in this embodiment are each a three-point lap and diagonal seatbelt which is adapted to hold the waist and upper part of the occupant's body. The seatbelts 22, 32, 42 and 52 are constituted by identical parts; that is, each seatbelt comprises webbing, a buckle, a latch plate, a fixture, and a webbing retractor. The webbing is a single continuous belt serving both as waist webbing and shoulder webbing. The buckle is detachably connected with the latch plate through which the webbing is passed and by means of which the length of the webbing is adjusted. Each seatbelt is attached to the vehicle by the fixture.

The seatbelt is fastened as the latch plate is coupled to the buckle, and the fastened state is input to an electronic control unit (ECU) 10. The ECU 10 also receives various kinds of signals on the vehicle 1, such as the vehicle speed.

In the seatbelt reminder system of this embodiment, the ECU 10 has a seat-belt fastening detector (seat-belt fastening detecting element) 11, a running-state detector (running-state detecting element) 12, a first reminder indicator (first reminder element) 13, a second reminder indicator (second reminder element) 14 and a reminder-start delay unit (reminder-start delay element) 15.

The detector 11 electrically converts signals indicating if the buckles of the seatbelts 22, 32, 42 and 52 are connected to the latch plates to detect the fastened state and unfastened state of the seatbelt for each of the seats 21, 31, 41 and 51, and sends the detection result to the first reminder indicator 13 and the second reminder indicator 14. Specifically, with the seatbelt fastened, a seatbelt switch $BELT_{SW}$ is set OFF, whereas with the seatbelt unfastened, the seatbelt switch $BELT_{SW}$ is set ON.

The detector 12 electrically converts a signal from an unillustrated speed sensor to detect the vehicle speed of the vehicle 1. This makes it possible to define the halt state of the vehicle 1 as a state from, for example, the point where the vehicle speed V is 0 km/h (0 mph) to a point where the vehicle speed V reaches $V_S$ (about 3 km/h (about 2 mph)) and define the running state of the vehicle 1 when the vehicle speed V exceeds $V_M$ (about 8 km/h (about mph)). The detector 12 then sends the signal on each state to the first reminder indicator 13 and the second reminder indicator 14.

In accordance with the results of detection from the detector 11 and the detector 12, the reminder indicators 13 and 14 in this embodiment sends each driving signals to a visual warning device and an auditory warning device to notify the occupants of the unfastened states of the seatbelts by lighting a lamp and sounding a buzzer. To avoid the unfastened state of the seatbelt as much as possible, the reminder indicator 13 informs each crew member of the unfastened state of the seatbelt.

Specifically, the first reminder indicator 13 determines that the first condition is satisfied at least when the seatbelt switch $BELT_{SW}$ is ON, defines the first reminder as executing light-ON for about 60 seconds and buzzing for about 6 seconds, and executes the first reminder.

At the time the second reminder is started by the second reminder indicator 14, the reminder-start delay unit 15 delays the start of the second reminder by a delay time Ta. Accordingly, the crew member can clearly distinguish between the first reminder and the second reminder, so that the crew member can be notified of the intention of the second reminder reliably.

The second reminder indicator 14 determines that the second condition is satisfied when the seatbelt switch $BELT_{SW}$ is ON, the vehicle speed V exceeds $V_M$ and the first reminder is finished, defines the second reminder as repeating light-ON and buzzing for A seconds and light-OFF and stopping buzzing for B (<A) seconds, and executes the second reminder. Accordingly, the first reminder and the second reminder being given consecutively is avoided. The pattern of light ON for A seconds is to execute C sets of a rectangular pattern of light ON for α seconds and light OFF for β(>α) seconds, whereas the pattern of buzzing for A seconds is to execute C sets of a rectangular pattern of light ON for α/3 seconds, light OFF for α/3 seconds, light ON for α/3 seconds and light OFF for β seconds. and stopping buzzing for B (<A) seconds, and executes the second reminder. Accordingly, the first reminder and the second reminder being given consecutively is avoided. The pattern of light ON for A seconds is to execute C sets of a rectangular pattern of light ON for a seconds and light OFF for β (>α) seconds, whereas the pattern of buzzing for A seconds is to execute C sets of a rectangular pattern of light ON for α/3 seconds, light OFF for α/3 seconds, light ON for α/3 seconds and light OFF for β seconds.

The second reminder indicator 14 enables re-reminding when halting of the vehicle 1 is detected after the second reminder is ended, and gives a reminder again when the unfastened state of the seatbelt and the running state of the vehicle 1 are detected after the halting state of the vehicle 1 is detected upon completion of the second reminder.

The second reminder indicator 14 is designed to execute the second reminder when it is determined that the vehicle speed sensor is in error. Specifically, the ECU 10 has an unillustrated failure determining unit which determines a failure in the vehicle speed sensor or the like, in such a way that when having determined an error in the vehicle speed sensor originated from disconnection or the like, the determining unit the error state to the reminder indicator 14. According to the result of the determination, the reminder indicator 14 sends a drive signal to a visual warning device to turn on the indicator. The lighting pattern for the indicator is set identical to the lighting pattern in the second reminder. As the second reminder having the vehicle speed condition is executed when it is determined that the vehicle speed sensor is in error, the crew member can be notified of the error state of the vehicle speed sensor more adequately. When it is determined that the vehicle speed sensor is in error, a reminder may be given using an acoustic warning device as done in the second reminder, but it is preferable to give a reminder by a visual warning device alone in order to reduce the annoyance the crew member would feel. The second reminder which is executed when it is determined that the vehicle speed sensor is in error need not be limited to the period Tf but may be continued until the determined error is cleared.

Figure 2:
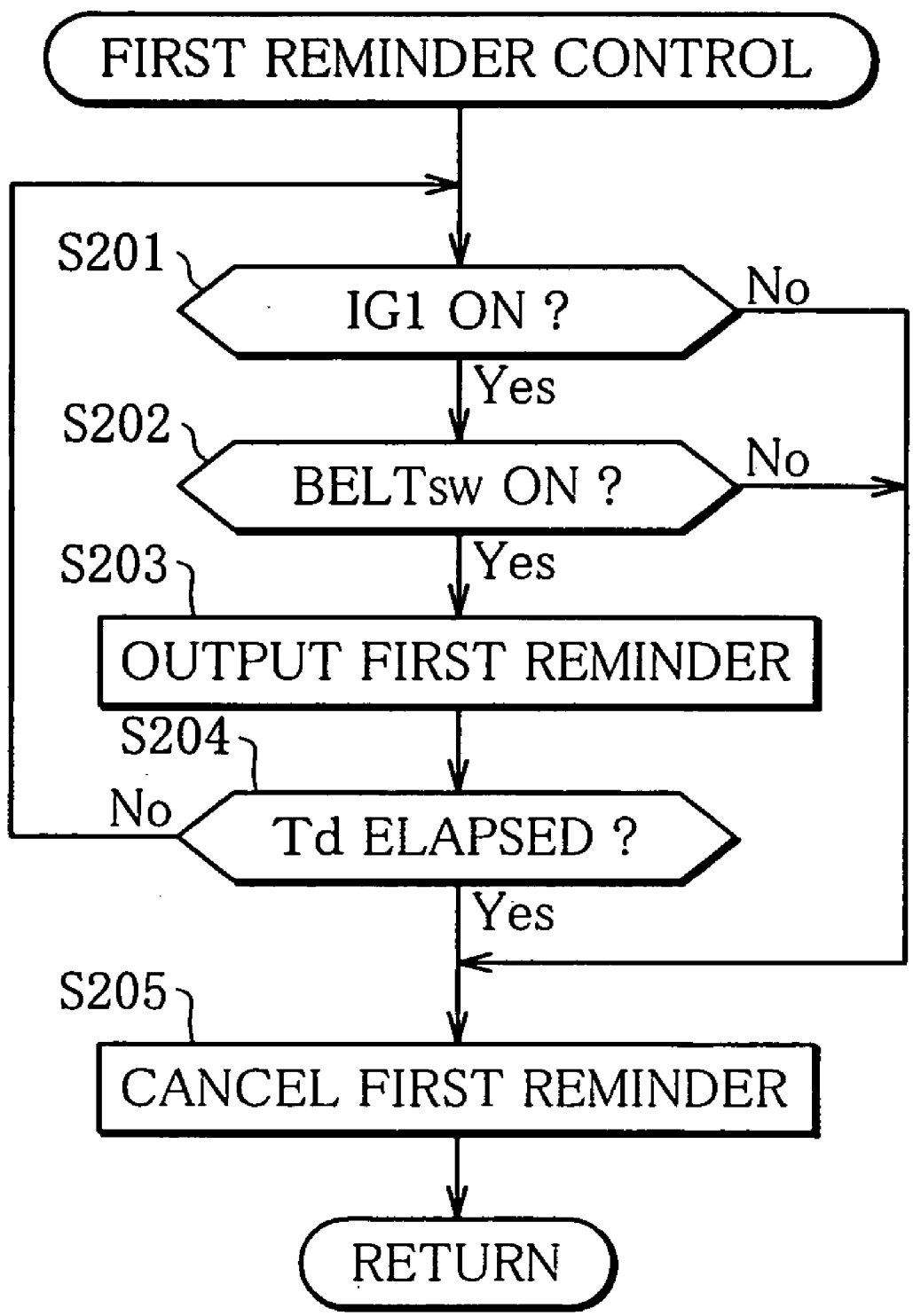
FIG. 2 is a flowchart for first reminder control which is executed by the seatbelt reminder system in FIG. 1.
Figure 3:
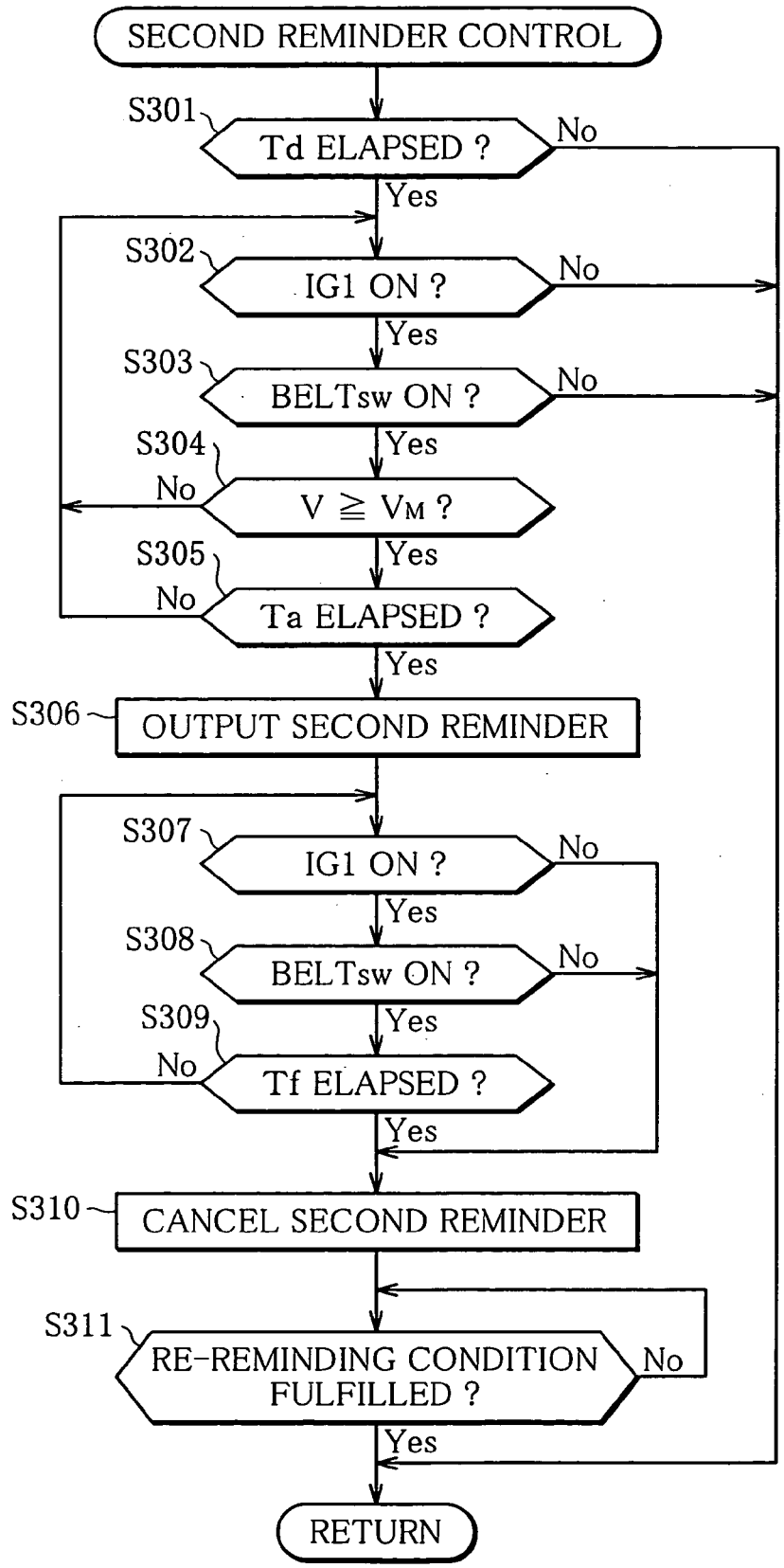
FIG. 3 is a flowchart for second reminder control which is executed by the seatbelt reminder system in FIG. 1.

FIGS. 2 and 3 illustrate flowcharts for first reminder control and second reminder control which are executed by the seatbelt reminder system. The following will discuss the operation of the seatbelt reminder system according to the present invention which has the above-described structure.

At step S201 in FIG. 2, it is determined whether the IG1 is ON or not. When the engine is active, i.e., the decision at the step is YES, the flow goes to step S202 where the seat-belt fastening detector 11 determines whether the seatbelt switch $BELT_{SW}$ is ON or not. When the seatbelt is not fastened, i.e., when the decision is YES, the flow goes to step S203.

When the IG1 is OFF at step S201 or when the seatbelt switch $BELT_{SW}$ is OFF at step S202, the flow goes to step S205 to cancel the first reminder after which the flow leaves the routine.

Figure 4:
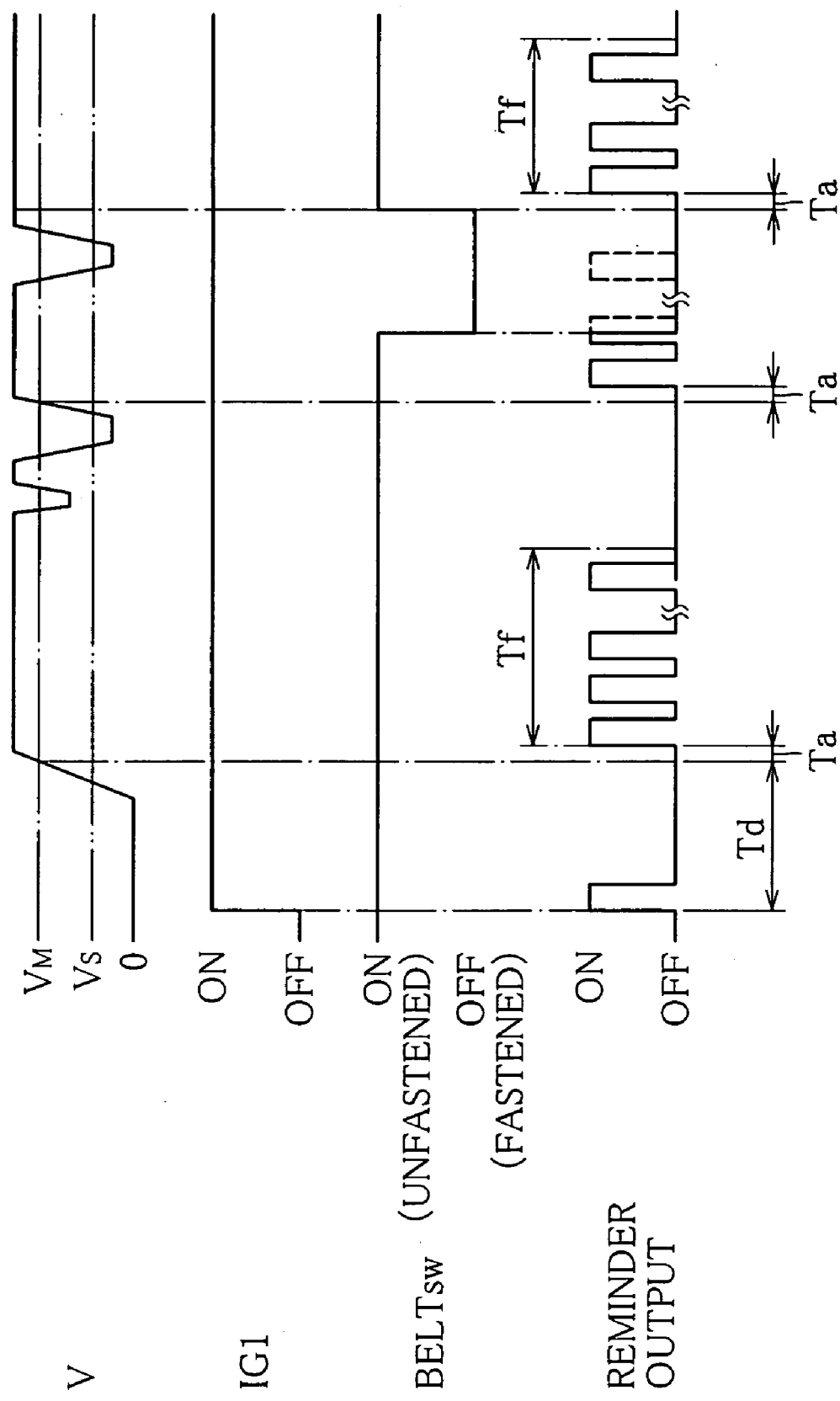
FIG. 4 is a timing chart for reminder control which is executed by the seatbelt reminder system in FIG. 1.

At step S203, the first reminder indicator 13 identifies that the first condition is met and outputs a drive signal for the first reminder. FIG. 4 shows a timing chart for reminder control. As illustrated in the diagram, in the case where the seatbelt switch $BELT_{SW}$ is ON when the IG1 is ON, a buzzer sound is generated for approximately 6 seconds. Although FIG. 4 shows only the generation of the reminder by means of the buzzer, the indicator is turned on as well. Specifically, the flow goes to step S204 to turn on the indicator to inform the unfastened state of the seatbelt until a first reminder period Td of about 60 seconds elapses. When it is determined that the period Td has passed, the flow goes to step S205 to end the first reminder after which the flow leaves the routine.

Then, at step S301 in FIG. 3, it is determined whether the first reminder period Td has elapsed. When it is determined that about 60 seconds have elapsed since the IG1 was set ON, the flow goes to step S302.

At step S302, it is determined whether the IG1 is ON or not. When the engine is active, i.e., the determination at the step is YES, the flow goes to step S303 where the seat-belt fastening detector 11 determines whether the seatbelt switch $BELT_{SW}$ is ON or not. When the seatbelt is not fastened, i.e., when the decision is YES, the flow goes to step S304.

At step S304, the detector 12 determines whether the vehicle speed V exceeds $V_M$ or not. When the vehicle speed V exceeds $V_M$, i.e., when the determination is YES, the flow goes to step S305 where the reminder-start delay unit 15 determines whether the delay time Ta has elapsed or not. When Ta has elapsed, i.e., when the decision is YES, the flow goes to step S306. When Ta has not elapsed, on the other hand, the flow returns to step S302.

At step S306, the second reminder indicator 14 identifies the second condition being satisfied and outputs a drive signal for the second reminder. That is, in the case where it is detected that the reminder period Td for the first reminder has elapsed, the IG1 is ON, the seatbelt switch $BELT_{SW}$ is ON and the vehicle speed V exceeds $V_M$, as shown in FIG. 4, the second reminder to repeat buzzing for A seconds and stopping buzzing for B seconds after elapsing of the period Ta is given until a period Tf passes (until buzzing and stopping buzzing are repeated N times) to notify the crew member of that even promptly. Flickering of the indicator which is achieved by the light ON of the indicator for A seconds and the light OFF of the indicator for B seconds is repeated N times. The pattern at the time of starting reminder may be designed in such a way as to flash the buzzer quickly and change the cycle for the indicator. Alternatively, the frequency may be changed only for the indicator to clarify the start point of the second reminder.

When it is determined at step S307 that the IG1 is OFF or at step S308 that the seatbelt switch $BELT_{SW}$ is OFF, the flow goes to step S310 to stop outputting the second reminder and cancel the second reminder. When it is determined at step S309 that Tf has elapsed, the flow goes to step S310 to end the second reminder too.

Thereafter, the reminder indicator 14 determines at step S311 whether re-reminding condition is satisfied or not. When the vehicle speed V becomes $V_S$ or lower, i.e., when the decision is YES, the flow leaves the routine.

If the second reminder indicator 14 recognizes that the second condition is satisfied due to the seatbelt switch $BELT_{SW}$ being still ON after the re-reminding condition is satisfied, the drive signal for the second reminder is output. That is, when the vehicle speed V falls to $V_S$ or lower and then exceeds $V_M$ again to fulfill the second condition, as shown in FIG. 4, the second reminder is carried out after the period Ta elapses. Although FIG. 4 shows a case where it is determined that the seatbelt switch $BELT_{SW}$ is OFF during generation of the second reminder, the generation of the second reminder is stopped immediately. Referring to FIG. 4, when it is determined thereafter that the seatbelt switch $BELT_{SW}$ is ON, the second condition is fulfilled and the second reminder is carried out after the period Ta elapses.

According to this embodiment, as described above, the seatbelt reminder system that uses visual warning and acoustic warning in parallel is provided with a short suspending period Ta at the start of the second reminder. In other words, when the vehicle speed V of the vehicle 1 exceeds $V_M$ and the seatbelt switch $BELT_{SW}$ is ON to fulfill the condition for the second reminder, buzzing and lighting of the indicator are started after the period Ta, thereby associating visual warning with acoustic warning when the second reminder is started. That is, the deviation between the start of visual warning and the start of acoustic warning is eliminated, thus making it possible to notify crew members of the intention of the second reminder reliably.

The present invention is not restrictive to one embodiment described above, but can be modified in various ways within the scope and spirit of the present invention.

For example, although visual warning and acoustic warning are used in parallel in the embodiment, the present invention is not limited to this particular embodiment but the first reminder and the second reminder may be carried out by using the same reminder device. As the first reminder and the second reminder take place consecutive due to the presence of the delay time Ta, crew members can easily identify the first reminder and the second reminder as per the embodiment by using the buzzer (or the indicator) alone.

The re-reminding condition set by the second reminder indicator 14 in the embodiment may be set at the point where the unfastened state of the seatbelt is changed to the fastened state besides the halting state of the vehicle 1. In this case, referring to FIG. 4, when the seatbelt switch $BELT_{SW}$ is set OFF to cancel the second reminder after which the IG1 is set ON and the switch $BELT_{SW}$ is set ON with the vehicle speed V exceeding $V_M$, the second reminder is executed after the period Ta elapses. A user may be allowed to select the re-reminding condition.

Further, the structure of the seatbelt is not limited to a 3-point belt but a 2-point seatbelt which restrains only the waist of a crew member, for example, or the webbing which has the waist webbing and the shoulder webbing constructed separately may be adequately used according to the position of the seat of interest.

Although the reminder indicator 13 in this embodiment repeats the light-ON state of the indicator for A seconds and the light-OFF state for B seconds as the second reminder N times, the reminder indicator 13 can also be adapted to a new reminder system which keeps lighting the indicator on in place of the light-OFF state for B seconds. In this case, the reminder ability can be maintained.

What is claimed is:

1. A seatbelt reminder system for outputting a reminder for an occupant when the occupant leaves a seatbelt unfastened, comprising:
   a seat-belt fastening detecting element which detects a fastened state of said seatbelt;
   a first reminder element which gives a first reminder when a first condition having an unfastened state of said seatbelt, detected by said seat-belt fastening detecting element, as at least a fulfilling condition is satisfied;
   a second reminder element which gives a second reminder when a second condition having said unfastened state of said seatbelt, detected by said seat-belt fastening detecting element, as at least a fulfilling condition is satisfied, the second condition including determination of whether an ignition switch is on after completion of the first reminder; and a reminder-start delay element which delays start of said second reminder when said second reminder by said second reminder element is started.

2. The seatbelt reminder system according to claim 1, wherein said reminder-start delay element delays start of said second reminder until a predetermined period elapses after said second condition is satisfied.

3. The seatbelt reminder system according to claim 1, wherein said second condition further has an end of said first reminder as one of fulfilling conditions.

4. The seatbelt reminder system according to claim 1, wherein said second reminder element gives said second reminder after said first reminder is finished, when said second condition is satisfied while said first reminder element is giving said first reminder, and said reminder-start delay element delays start of said second reminder until a predetermined period elapses since an end of said first reminder.

5. The seatbelt reminder system according to claim 4, wherein said second condition further has a predetermined condition in addition to said first condition.

6. The seatbelt reminder system according to claim 1, wherein said first reminder by said first reminder element and said second reminder by said second reminder element are carried out by using a same reminder device.

7. A seatbelt reminder system for outputting a reminder for an occupant when the occupant leaves a seatbelt unfastened, comprising:

a seat-belt fastening detecting element which detects a fastened state of said seatbelt;

a first reminder element which gives a first reminder in a first pattern when a first condition having an unfastened state of said seatbelt, detected by said seat-belt fastening detecting element, as at least a fulfilling condition is satisfied; and a second reminder element which gives a second reminder in a second pattern different from said first pattern when a second condition having said unfastened state of said seatbelt, detected by said seat-belt fastening detecting element, an end of said first reminder or said first condition as at least a second fulfilling condition is satisfied, the second condition including determination of whether an ignition switch is on after completion of the first reminder.

8. The seatbelt reminder system according to claim 7, wherein said first reminder by said first reminder element and said second reminder by said second reminder element are carried out by using a same reminder device.

9. A seatbelt reminder method for outputting a reminder for an occupant when the occupant leaves a seat belt unfastened, comprising:

detecting a fastened state of said seatbelt;

giving a first reminder when a first condition having an unfastened state of said seatbelt as at least a fulfilling condition is satisfied;

giving a second reminder when a second condition having said unfastened state of said seatbelt as at least a fulfilling condition is satisfied, the second condition including determination of whether an ignition switch is on after completion of the first reminder giving step; and delaying start of said second reminder when said second condition is satisfied and said second reminder is started.

10. The seatbelt reminder method according to claim 9, wherein start of said second reminder is delayed until a predetermined period elapses after said second condition is satisfied.

11. The seatbelt reminder method according to claim 9, wherein said second reminder is given after said first reminder is finished, when said second condition is satisfied while said first reminder is being given, and start of said second reminder is delayed until a predetermined period elapses since an end of said first reminder.

12. The seatbelt reminder system according to claim 1, further comprising:

a vehicle speed detecting element that detects a vehicle speed, wherein the second reminder element gives a third reminder after giving the second reminder when the seat-belt fastening detecting element detects the unfastened state of said seatbelt, the vehicle speed reduces below a first predetermined value, and, thereafter, the vehicle speed increases above a second predetermined value higher than the first predetermined value.

13. The seatbelt reminder system according to claim 7, further comprising:

a vehicle speed detecting element that detects a vehicle speed, wherein the second reminder element gives a third reminder after giving the second reminder when the seat-belt fastening detecting element detects the unfastened state of said seatbelt, the vehicle speed reduces below a first predetermined value, and, thereafter, the vehicle speed increases above a second predetermined value higher than the first predetermined value.

14. The seatbelt reminder method according to claim 9, further comprising:

detecting a speed of a vehicle; and giving a third reminder after giving the second reminder when an unfastened state of said seatbelt is detected, the detected speed reduces below a first predetermined value, and, thereafter, the detected vehicle speed increases above a second predetermined value higher than the first predetermined value.

* * * * *